(12) United States Patent
Liu

(10) Patent No.: US 8,502,466 B2
(45) Date of Patent: Aug. 6, 2013

(54) APPARATUS FOR LED LIGHTS WHICH INTEGRATES A BOOST CONVERTER CONTROL MODULE

(75) Inventor: Wenli Liu, Shanghai (CN)

(73) Assignee: Shanghai ORI-ADV Decoration Co., Ltd, Shanghai (CN)

( * ) Notice: Subject to any disclaimer, the term of this patent is extended or adjusted under 35 U.S.C. 154(b) by 154 days.

(21) Appl. No.: 13/055,897

(22) PCT Filed: Oct. 20, 2010

(86) PCT No.: PCT/CN2010/077896
§ 371 (c)(1),
(2), (4) Date: Jan. 25, 2011

(87) PCT Pub. No.: WO2012/051753
PCT Pub. Date: Apr. 26, 2012

(65) Prior Publication Data
US 2012/0217879 A1    Aug. 30, 2012

(51) Int. Cl.
*H05B 37/02* (2006.01)
(52) U.S. Cl.
USPC .......... 315/291; 315/200 R; 315/224
(58) Field of Classification Search
USPC ............. 315/200 R, 209 R, 224–226, 291, 315/307, 308, 312
See application file for complete search history.

(56) References Cited

U.S. PATENT DOCUMENTS

| | | | | |
|---|---|---|---|---|
| 7,276,863 | B2 * | 10/2007 | Lee et al. | 315/307 |
| 7,825,612 | B2 * | 11/2010 | Lee | 315/308 |
| 8,237,372 | B2 * | 8/2012 | Hoogzaad et al. | 315/291 |
| 2008/0106216 | A1 | 5/2008 | Yu et al. | |

FOREIGN PATENT DOCUMENTS

| | | |
|---|---|---|
| CN | 2334054 Y | 8/1999 |
| CN | 2720760 Y | 8/2005 |
| CN | 201054835 Y | 4/2008 |
| CN | 201185493 Y | 1/2009 |
| CN | 101370335 Y | 2/2009 |
| CN | 201226608 Y | 4/2009 |
| CN | 201392375 Y | 1/2010 |
| JP | 2000253653 A | 9/2000 |

OTHER PUBLICATIONS

International Search Report, International Patent Application No. PCT/CN2010/077896, Published on Apr. 26, 2012, 5 pages (in Chinese Language).

* cited by examiner

*Primary Examiner* — Jimmy Vu
(74) *Attorney, Agent, or Firm* — Fitch, Even, Tabin & Flannery LLP

(57) ABSTRACT

An apparatus for LED lights which integrates a voltage booster module is provided. The string lights in series-parallel construction, which is originally powered by a high voltage, becomes now powered by a low voltage. Thus, a dry cell or a solar cell can be used as a power supply, which decreases the needs for electricity from the power rail. Accordingly, less carbon dioxide is generated and energy is also saved.

13 Claims, 1 Drawing Sheet

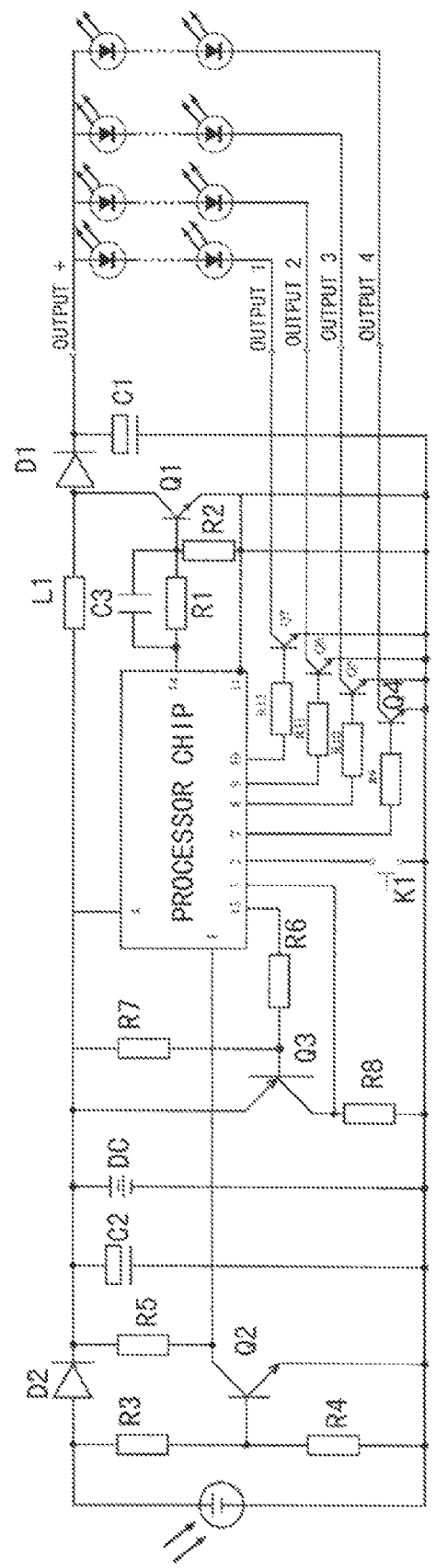

US 8,502,466 B2

APPARATUS FOR LED LIGHTS WHICH INTEGRATES A BOOST CONVERTER CONTROL MODULE

CROSS REFERENCE TO RELATED APPLICATIONS

This application is a national phase application of International Application No. PCT/CN2010/077896, filed Oct. 20, 2010, designating the United States, which is incorporated by reference herein in its entirety.

FIELD OF THE INVENTION

The present disclosure relates to an apparatus for LED lights, and more specifically to an apparatus for LED lights which integrates a booster controller.

BACKGROUND

Current LED string lights can be categorized into two types: low voltage string lights and high voltage string lights. The high voltage string lights refer to string lights (generally operates at 6V,12V,24V,48V,110V,220V) powered by an AC power supply or by a power converter (e.g., transformer, AC/DC converter, etc), which is able to provide voltage higher than 5V. The low voltage string lights refer to string lights powered by dry battery, button battery, rechargeable battery, solar cell, etc, which operates at a voltage lower than 5V, generally around 3V.

The high voltage string lights may assemble in series-parallel construction and the low voltage string lights can only operate in parallel.

Since the high voltage string lights require a relatively high voltage, the utilization of the low voltage power supply, such as the application of solar cell, is encumbered, which is unfavorable to environmental protection.

SUMMARY

The object of the present disclosure is to solve the above-mentioned problem by providing an apparatus for LED lights which integrates a voltage booster control module. According to the present disclosure, the string lights in parallel or in series, which is conventionally powered by a high voltage, becomes now powered by a low voltage. Thus, a dry cell or a solar cell can be used as a power supply, which decreases the needs for electricity from the power rail. Accordingly, less carbon dioxide is generated and the energy is also saved.

There is provided an apparatus for LED lights which integrates a booster control module. The apparatus includes a booster control module and at least one LED light, wherein the booster control module boosts an initial voltage and output a boosted voltage. The booster control module further comprises:
  a power supply for supplying the initial voltage;
  a pulse generator, coupled to the power supply;
  a first triode (Q1), wherein a base of the first triode is coupled to a pulse signal output terminal of the pulse generator;
  a first rectifying diode (D1), wherein a first terminal of the first rectifying diode (D1) is coupled to a collector of the first triode (Q1), a second terminal of the first rectifying diode (D1) serves as an anode of a resulting voltage output, and a terminal of at least one LED light is coupled to the anode of the resulting voltage output;
  a first filter (C1), coupled in parallel between the second terminal of the first rectifying diode (D1) and an emitter of the first triode (Q1);
  an inductor (L1) or a resistor (R), wherein a first terminal of the inductor (L1) is coupled to the power supply and a second terminal of the inductor (L1) is coupled to the first terminal of the first rectifying diode (D1), or a first terminal of the resistor (R) is coupled to the power supply and a second terminal of the resistor (R) is coupled to the first terminal of the firs rectifying diode (D1).

In one embodiment of the present disclosure, the pulse generator further comprises:
  a processor chip (IC), wherein two terminals of the power supply are coupled to the processor chip (IC);
  a first divider circuit, comprising a first resistor (R1) and a second resistor (R2), wherein a first terminal of the first resistor (R1) is coupled to a first pin of the processor chip (IC), a second terminal of the first resistor (R1) is coupled to a first terminal of the second resistor (R2), and a second terminal of the second resistor (R2) is coupled to a second pin of the processor chip (IC);
  a capacitor (C3), coupled in parallel between the first terminal of the first resistor (R1) and the second terminal of the resistor (R1).

In one embodiment of the present disclosure, the pulse generator is comprised of discrete components.

In one embodiment of the present disclosure, the processor chip (IC) is configured to generate a positive pulse signal at the first pin, which turns the first triode (Q1) on via the first divider circuit; the power supply is configured to enable an input of the first rectifying diode (D1) to be a pulse signal via the inductor (L1) or the resistor (R), and the pulsed turn-on of the first triode (Q1); the pulse signal turns into a double voltage rectification mode after the pulse signal is rectified by the first rectifying diode (D1), and further becomes the resulting output voltage higher than the initial voltage of the power supply after being filtered by the first filter (C1).

In one embodiment of the present disclosure, the apparatus for LED lights further comprises a charging device for charging the power supply.

In one embodiment of the present disclosure, the charging device comprises a solar cell or a wind-powered motor.

In one embodiment of the present disclosure, at least one of the output pins of the processor chip is coupled to a fourth triode (Q4) via a current limiting resistor (R9), and a base of the fourth triode (Q4) is coupled to the current limiting resistor (R9), an emitter of the fourth triode (Q4) is coupled together, a collector of the fourth triode (Q4) serves as a cathode of the resulting voltage output; and a high voltage or a low voltage is output at the collector of the fourth triode (Q4) under the control of the processor chip, and the other terminal of the at least one LED light is coupled to the cathode of the resulting voltage output.

In one embodiment of the present disclosure, the apparatus further comprises:
  a second divider circuit comprising a third resistor (R3) and a fourth resistor (R4), wherein the charging device is coupled between a first terminal of the third resistor (R3) and a second terminal of the fourth resistor (R4);
  a second triode (Q2), wherein a base of the second triode (Q2) is coupled to a second terminal of the third resistor (R3); an emitter of the second triode (Q2) is coupled to the second terminal of the fourth resistor (R4); and a collector of the second triode (Q2) is coupled to a third pin of the processor chip;

a second rectifying diode (D2), wherein a first terminal of the second rectifying diode (D2) is coupled to the first terminal of the third resistor (R3), and a second terminal of the second rectifying diode (D2) is coupled to a fourth pin of the processor chip;

a second filter (C2), wherein a first terminal of the second filter (C2) is coupled to the second terminal of the second rectifying diode (D2), and a second terminal of the second filter (C2) is coupled to the second terminal of the fourth resistor (R4);

a pull-up resistor (R5), coupled between the second terminal of the second rectifying diode (D2) and the collector of the second triode (Q2).

In one embodiment of the present disclosure, the charging device generates a charging voltage, and the second divider circuits divides charging voltage so that the second triode (Q2) turns on and thus the third pin of the processor chip is controlled at a low voltage level, thereby rendering the processor chip to turn into in a charging mode in which the processor chip powers on and the LED light turns off. A charging current of the charging device charges the power supply after the charging current is rectified by the second rectifying diode (D2) and filtered by the second filter (C2).

In one embodiment of the present disclosure, when the charging device is disabled, the second triode (Q2) does not turns on and the fifth resistor (R5) sets the input of the third pin of the processor chip at a high voltage level so that the processor chip turns to an operating state in which the output of the processor chip is enabled and the LED light turns on.

In one embodiment of the present disclosure, the apparatus for LED lights further comprises:

a third triode (Q3), wherein a base of the third triode (Q3) is coupled to a fifth pin of the processor chip via a sixth resistor (R6), a collector of the third triode (Q3) is coupled to a sixth pin of the processor chip and an emitter of the third triode (Q3) is coupled to the fourth pin of the processor chip.

In one embodiment of the present disclosure, when the processor chip is in the operating state, the LED turns on and the fifth pin of the processor chip outputs a low voltage. The sixth resistor (R6) and a seventh resistor (R7) form a third voltage divider circuit. The processor chip monitors the resulting output voltage. If the resulting output voltage is lower than a predetermined value, the third triode (Q3) changes from an ON state to an OFF state under the control of the voltage at the base of the third triode (Q3), the sixth pin of the processor chip is thus at a low voltage level which renders the processor chip in a sleep mode in which the output of the processor chip is disabled and the LED light turns off, so that the power supply will not be over discharged.

In one embodiment of the present disclosure, the processor chip further comprises a timer circuit. When the timer reaches a threshold, the processor chip automatically turns into a sleep mode, thereby disabling the output of the processor chip and turning off the LED lights, so that the power supply will not be over discharged.

In one embodiment of the present disclosure, a switch (K1) is coupled between a seventh pin of the processor chip and the cathode of the resulting output voltage. The switch (K1) enables the seventh pin of the processor chip to be at a low voltage level. The ON and OFF of the switch (K1) is able to control the output of the LED light and imbues the LED light with functions of being constantly ON, being constantly OFF or flicker.

Compared with prior arts, the present disclosure is imbued with the following technical effects. According to the present disclosure, the present circuit is designed to boost the initial operating voltage so that the resulting output voltage meets the requirement of the string lights in series-parallel construction which are otherwise powered by a high voltage. One aspect of the present disclosure is applicable to decreasing the needs for electricity from the power rail. Accordingly, a large amount of chemical fuel can be saved every year from the power rail and thus creating an environmental-friendly and low carbon life. In another aspect of the present disclosure, considering the fact that the production of LED in series-parallel string lights currently enjoys a high level of mechanization, whereas the low-voltage-powered LED string lights which are coupled in parallel mainly involves man power, the control apparatus according to the present disclosure may help to greatly improve the productivity.

BRIEF DESCRIPTION OF THE DRAWINGS

FIG. 1 illustrates a circuit diagram of an apparatus for LED lights which integrates a booster control module according to one embodiment of the present invention.

DETAILED DESCRIPTION

Detailed description will be made to the present invention in conjunction with the embodiments and the accompanying drawing.

A First Embodiment of an Apparatus for Led Lights Which Integrates a Boost Control Module FIG. 1 illustrates a circuit diagram of an apparatus for LED lights which integrates a booster control module according to one embodiment of the present invention. Referring to FIG. 1, the apparatus for LED lights integrating a booster control module mainly includes a booster control module and at least one LED light (four LED lights are illustrated in FIG. 1). The booster control module includes a power supply DC, a processor chip IC, a first voltage divider circuit constituted by a first resistor R1 and a second resistor R2, a first triode Q1, a first rectifying diode D1, a first filter C1 and an inductor L1.

The power supply DC is configured to provide an operating voltage, i.e., an initial voltage which is a low voltage. The power supply DC may include, for example, a dry battery, a Nickel-Cadmium battery, a Nickel-Metal Hydride battery, or a Lithium ion battery, etc. Two terminals of the power supply DC are coupled to the processor chip IC. The anode of the power supply DC is coupled to pin IC-4 (also referred to as a fourth pin) of the processor chip IC, whereas the cathode of the power supply DC is coupled to pin IC-2 (also referred to as a seventh pin) of the processor chip IC via a switch K1. A first terminal of the first resistor R1 is coupled to pin IC-14 (also referred to as a first pin) of the processor chip. A second terminal of the first resistor R1 is coupled to a first terminal of the second resistor R2. A second terminal of the second resistor R2 is coupled to pin IC-11 (also referred to as a second pin) of the processor chip. A capacitor C3 is coupled in parallel with the first resistor R1. The base of the first triode Q1 is coupled to the second terminal of the first resistor R1, while the emitter of the first triode Q1 is coupled to the second terminal of the second resistor R2.

A first terminal of the inductor L1 is coupled to the pin IC-4 of the processor chip, which is equal to being coupled to the anode of the power supply DC. A second terminal of the inductor L1 is coupled to the collector of the first triode Q1, which is equal to being coupled to a first terminal of the first rectifying diode D1.

It is appreciated that the inductor L1 herein may be replaced with a resistor R. In other words, a resistor R can be used to replace the inductor L1 to achieve the technical effect of the present disclosure.

The first terminal of the first rectifying diode D1 is coupled to the collector of the first triode Q1. A second terminal of the first rectifying diode D1 serves as an anode of the resulting output voltage.

The first filter C1 is coupled in parallel between the second terminal of the first rectifying diode D1 and the collector of the first triode Q1.

The aforementioned circuit functions to boost voltage. A positive pulse signal is produced at the pin IC-14 according to an internal program stored in the processor chip. Through the voltage divider circuit including the first resistor R1 and the second resistor R2, the base of the first triode Q1 is at a low voltage level at usual. When a positive pulse is generated at the pin IC-14 of the processor chip, the base of the first triode Q1 is converted to a high voltage level such that the first triode Q1 turns on. The power supply DC enables the input of the first rectifying diode D1 to be a pulse signal via the inductor L1 and pulsed turn-on of the first triode Q1. After the pulse signal is rectified by the first rectifying diode D1, it turns into a double voltage rectification mode. After being filtered by the first filter C1, the pulse signal ultimately becomes a 12-48V high voltage. The frequency and amplitude of the pulse generated by the processor chip allow the output of the first rectifying diode D1 to reach 100V.

A charging device is coupled in parallel with the power supply DC. Since the charging device is coupled in parallel with the power supply DC, the two terminals of the charging device are also coupled to the pins of the processor chip, respectively. In the present embodiment, the charging device may be a solar cell. Of course, the charging device may be other device having charging functionality. In FIG. 1, the pins IC-7, IC-8, IC-9, IC-10 of the processor chip are all output pins. Take an example of the pin IC-7, the output pin IC-7 is coupled to the base of the fourth triode Q4 via a current limiting resistor R9. The collector of the fourth triode Q4 serves as the cathode of the resulting output voltage. Similarly, the other pins IC-8, IC-9, and IC-10 are respectively coupled to the bases of triodes Q5, Q6 and Q7 via current limiting resistors R10, R11 and R12. The collectors of these triodes Q4-Q7 serve as the cathode of the resulting output voltage. The emitters of these triodes Q4-Q7 are connected together. The LED string lights are coupled between the second terminal of the first rectifying diode D1 which may serve as the anode of the resulting output voltage and the collector of the fourth triode Q4 which may serve as the cathode of the resulting output voltage. In FIG. 1, a first group of LED string lights is coupled between the second terminal (the anode of the resulting output voltage) of the first rectifying diode D1 and the collector (the cathode of the resulting output voltage) of the triode Q7. A second group of LED string lights is coupled between the second terminal (the anode of the resulting output voltage) of the first rectifying diode D1 and the collector (the cathode of the resulting output voltage) of the triode Q6. A third group of LED string lights is coupled between the second terminal (the anode of the resulting output voltage) of the first rectifying diode D1 and the collector (the cathode of the resulting output voltage) of the triode Q5. A fourth group of LED string lights is coupled between the second terminal (the anode of the resulting output voltage) of the first rectifying diode D1 and the collector (the cathode of the resulting output voltage) of the triode Q4.

When the pins IC-7, IC-8, IC-9 and IC-10 output a high voltage, the LED string lights coupled thereto turn on constantly. When the pins IC-7, IC-8, IC-9 and IC-10 output a low voltage, the LED string lights coupled thereto turn off constantly. When the pins IC-7, IC-8, IC-9 and IC-10 output a high voltage in turn, the LED string lights coupled thereto will turn on in turn (i.e., output in pipeline). When the pins IC-7, IC-8, IC-9 and IC-10 output a high voltage at regular time intervals, the LED string lights coupled thereto may flicker quickly or slowly depending on the length of the time intervals.

The apparatus according to the present embodiment may further include a circuit located at one side of the solar cell. The circuit may include a second divider circuit including a third resister R3 and a fourth resistor R4, a second triode Q2, a second rectifying diode D2, a second filter C2 and a fifth resistor R5.

The solar cell is coupled between the first terminal of the third resister R3 and the second terminal of the fourth resistor R4. The base of the second triode Q2 is coupled to the second terminal of the third resistor R3. The emitter is coupled to the second terminal of the fourth resistor R4. The collector is coupled to the pin IC-1 of the processor chip. The first terminal of the second rectifying diode D2 is coupled to the first terminal of the third resistor R3. The second terminal of the second rectifying diode D2 is coupled to the pin IC-4 of the processor chip. The first terminal of the second filter C2 is coupled to the second terminal of the second rectifying diode D2. The second terminal of the second filter C2 is coupled to the second terminal of the fourth resistor R4. The fifth resistor R5 is coupled between the second terminal of the second rectifying diode D2 and the collector of the second triode Q2.

The base of the third triode Q3 is coupled to the pin IC-13 of the processor chip via the sixth resistor R6. The collector of the third triode Q3 is coupled to the pin IC-3 of the processor chip. The emitter of the third triode Q3 is coupled to the pin IC-4 of the processor chip.

Moreover, a switch K1 is coupled between the pin IC-2 of the processor chip and the collector of the third triode Q3. The switch K1 may enable the input of the pin IC-2 of the processor chip to be at a low voltage level. Every time a low voltage is input to the pin IC-2, the output mode is changed once. For example, the LED string lights may be changed from constant ON mode to pipeline mode.

After the solar cell has been exposed to the sunlight, the charging voltage is generated. Through the voltage divider including the third resistor R3 and the fourth resistor R4, the charging voltage enables the second triode Q2 to turn on. As such, the pin IC-1 of the processor chip is therefore at a low voltage level. The low voltage level at the pin IC-1 enables the internal program stored in the processor chip to turn automatically into a charging mode in which the processor chip powers on and the LED string lights turns off. The charging current of the solar cell may charge the power supply DC after it is rectified by the second rectifying diode D2 and filtered by the second filter C2.

When there is no sunlight shining on the solar cell, the second triode Q2 does not turn on. The fifth resistor R5 pulls up the input of the IC-1 of the processor chip to a high voltage level. The internal program of the processor chip automatically turns into an operating state in which the output of the processor chip is enabled, and the LED string lights turns on.

When the solar cell is not in a charging mode, i.e., the processor chip is in an operating state which outputs signals, the LED string lights turns on. The pin IC-13 (also referred to as a fifth pin) of the processor chip outputs a high voltage level. The fifth resistor R5 and the sixth resistor R6 constitute a third divider circuit. The processor chip monitors the resulting output voltage. When the resulting output voltage is lower than a predetermined value, the third triode Q3, subject to the voltage at the base, changes from a turn-on state into a turn-off state. A low voltage is fed to the pin IC-3 (also referred to as the sixth pin) of the processor chip. Thus, the processor chip turns into a sleep mode in which the output of the processor chip is disabled and the LED light turns off As such, the power supply DC will not be over discharged.

Moreover, a timer circuit may also be integrated into the processor chip. When the timer reaches a threshold, the processor chip may automatically turn into a sleep mode in which the output of the processor chip is disabled and the LED string lights turns off. The power supply DC will not be over discharged and thus the power supply DC is protected.

It is appreciated that the arrangement of the above-mentioned processor chip IC, the first resistor R1, the second resistor R2 and the capacitor C3 is only one embodiment for enabling the base of the first triode Q1 to output pulse signals. In other words, the above-mentioned processor chip, the first resistor R1, the second resistor R2 and the capacitor C3 may be replaced with a pulse generator. The pulse generator may be coupled to the base of the first triode Q1, which is used to feed a pulse signal to the base of the first triode Q1. In addition to the first embodiment where the processor chip is used to realize the functionality of the pulse generator, some simple discrete components such as RC circuit, LC circuit, can also be used to realize the functionality of the pulse generator. Since the utilization of the discrete components for acting as the pulse generator belongs to a customary means, details are omitted herein for brevity.

The foregoing embodiments are provided in order to give examples to those skilled in the art in order to practice the present disclosure. Various modifications or alternations may be made by those skilled in the art without departing from the spirit of the present disclosure. Therefore, the foregoing embodiments shall not be construed as limiting to the scope of present disclosure. Rather, the present disclosure should be construed in the largest scope in accordance with inventive features as recited in the claims.

What is claimed is:

1. An apparatus for LED lights which integrates a booster control module, comprising a booster control module and at least one LED light, wherein the booster control module boosts an initial voltage and output a boosted voltage, and the booster control module further comprises:
   a power supply for providing the initial voltage;
   a pulse generator, coupled to the power supply, the pulse generator comprising:
      a processor chip, wherein two terminals of the power supply are coupled to the processor chip;
      a first divider circuit, comprising a first resistor and a second resistor, wherein a first terminal of the first resistor is coupled to a first pin of the processor chip, a second terminal of the first resistor is coupled to a first terminal of the second resistor, and a second terminal of the second resistor is coupled to a second pin of the processor chip;
      a capacitor, coupled in parallel between the first terminal of the first resistor and the second terminal of the resistor;
   a first triode, wherein a base of the first triode is coupled to a pulse signal output terminal of the pulse generator;
   a first rectifying diode, wherein a first terminal of the first rectifying diode is coupled to a collector of the first triode, a second terminal of the first rectifying diode serves as an anode of a resulting voltage output, and a terminal of at least one LED light is coupled to the anode of the resulting voltage output;
   a first filter, coupled in parallel between the second terminal of the first rectifying diode and an emitter of the first triode; and
   an inductor or a resistor, wherein a first terminal of the inductor is coupled to the power supply and a second terminal of the inductor is coupled to the first terminal of the first rectifying diode, or a first terminal of the resistor is coupled to the power supply and a second terminal of the resistor is coupled to the first terminal of the first rectifying diode.

2. The apparatus of claim 1, wherein the pulse generator is comprised of discrete components.

3. The apparatus of claim 1, wherein the processor chip is configured to generate a positive pulse signal at the first pin, which turns the first triode on via the first divider circuit; the power supply is configured to enable an input of the first rectifying diode to be a pulse signal via the inductor or the resistor, and via the pulsed turn-on of the first triode; the pulse signal turns into a double voltage rectification mode after the pulse signal is rectified by the first rectifying diode, and further becomes the resulting output voltage higher than the initial voltage of the power supply after being filtered by the first filter.

4. The apparatus of claim 3, further comprising a charging device for charging the power supply.

5. The apparatus of claim 4, wherein the charging device comprises a solar cell or a wind-powered motor.

6. The apparatus of claim 4, wherein at least one output pin of the processor chip is coupled to a fourth triode via a current limiting resistor, and a base of the fourth triode is coupled to the current limiting resistor, an emitter of the fourth triode is coupled together, a collector of the fourth triode serves as a cathode of the resulting voltage output; and a high voltage or a low voltage is output at the collector of the fourth triode under the control of the processor chip, and the other terminal of the at least one LED light is coupled to the cathode of the resulting voltage output.

7. The apparatus of claim 6, further comprising:
   a second divider circuit comprising a third resistor and a fourth resistor, wherein the charging device is coupled between a first terminal of the third resistor and a second terminal of the fourth resistor;
   a second triode, wherein a base of the second triode is coupled to a second terminal of the third resistor; an emitter of the second triode is coupled to the second terminal of the fourth resistor; and a collector of the second triode is coupled to a third pin of the processor chip;
   a second rectifying diode, wherein a first terminal of the second rectifying diode is coupled to the first terminal of the third resistor, and a second terminal of the second rectifying diode is coupled to a fourth pin of the processor chip;
   a second filter, wherein a first terminal of the second filter is coupled to the second terminal of the second rectifying diode, and a second terminal of the second filter is coupled to the second terminal of the fourth resistor; and
   a pull-up resistor, coupled between the second terminal of the second rectifying diode and the collector of the second triode.

8. The apparatus of claim 7, wherein the charging device generates a charging voltage, and the second divider circuits divides charging voltage so that the second triode turns on and thus the third pin of the processor chip is controlled at a low voltage level, thereby rendering the processor chip to turn into in a charging mode in which the processor chip powers on and the at least one LED light turns off; and wherein a charging current of the charging device charges the power supply after the charging current is rectified by the second rectifying diode and filtered by the second filter.

9. The apparatus of claim 8, wherein when the charging device is disabled, the second triode does not turn on and the fifth resistor sets the input of the third pin of the processor chip at a high voltage level so that the processor chip turns to an operating state in which the output of the processor chip is enabled and the at least one LED light turns on.

10. The apparatus of claim 9, further comprises:
a third triode, wherein a base of the third triode is coupled to a fifth pin of the processor chip via a sixth resistor, a collector of the third triode is coupled to a sixth pin of the processor chip and an emitter of the third triode is coupled to the fourth pin of the processor chip.

11. The apparatus of claim 10, wherein when the processor chip is in the operating state, the at least one LED turns on and the fifth pin of the processor chip outputs a low voltage, and the sixth resistor and a seventh resistor forms a third voltage divider circuit; and wherein the processor chip monitors the resulting output voltage; if the resulting output voltage is lower than a predetermined value, the third triode changes from an ON state to an OFF state under the control of the voltage at the base of the third triode, the sixth pin of the processor chip is thus at a low voltage level which renders the processor chip in a sleep mode in which the output of the processor chip is disabled and the at least one LED light turns off, so that the power supply will not be over discharged.

12. The apparatus of claim 11, wherein the processor chip further comprises a timer circuit; when the timer reaches a threshold, the processor chip automatically turns into a sleep mode, thereby disabling the output of the processor chip and turning off the at least one LED light, so that the power supply will not be over discharged.

13. The apparatus of claim 10, wherein a switch is coupled between a seventh pin of the processor chip and the cathode of the resulting output voltage, and the switch enables the seventh pin of the processor chip to be at a low voltage level, and wherein the ON and OFF of the switch is able to control the output of the at least one LED light and imbues the at least one LED light with functions of being constantly ON, being constantly OFF or flicker.

* * * * *